W. A. SHIPPERT.
MILKING MACHINE FOR COWS.
APPLICATION FILED MAR. 18, 1918.
1,365,064.
Patented Jan. 11, 1921.
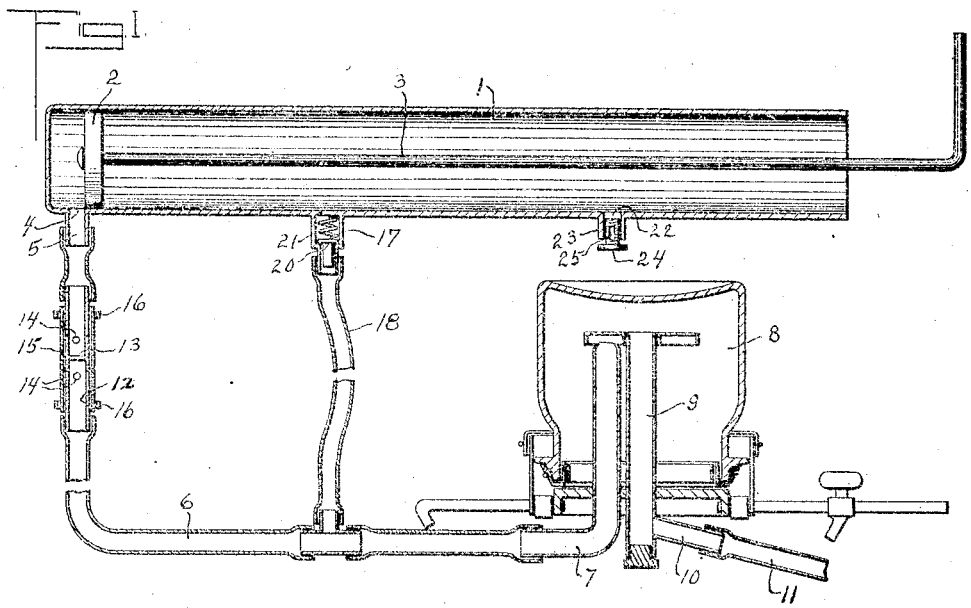
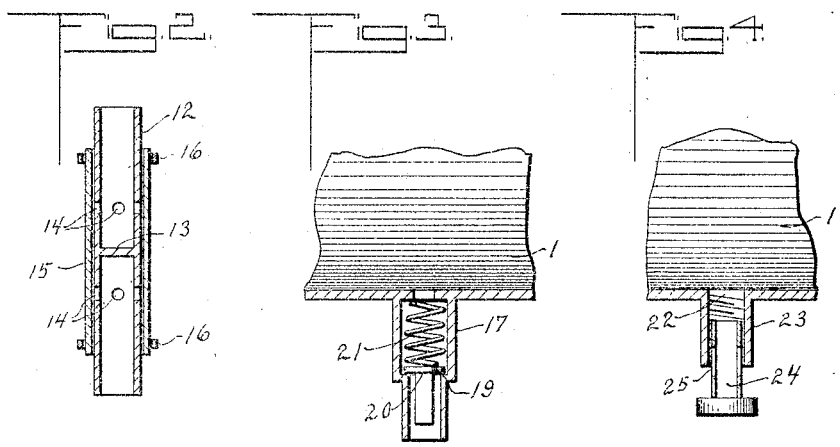
Witness
Frank W. Haskell
Inventor
Warren A. Shippert,
By Walter N. Haskell
his Attorney

UNITED STATES PATENT OFFICE.

WARREN A. SHIPPERT, OF CHICAGO, ILLINOIS.

MILKING-MACHINE FOR COWS.

1,365,064.  Specification of Letters Patent.  Patented Jan. 11, 1921.

Application filed March 18, 1918. Serial No. 222,999.

*To all whom it may concern:*

Be it known that I, WARREN A. SHIPPERT, a citizen of the United States, residing at Chicago, in the county of Cook and State of Illinois, have invented certain new and useful Improvements in Milking-Machines for Cows, of which the following is a specification.

My invention has reference to milking machines for cows, of that class wherein the milk is drawn from the animal by means of devices having a vibratory action, produced by air-exhaust mechanism.

The structure of a cow's udder and teats is such as to resist a normal atmospheric pressure. When the suction apparatus of a milking machine is applied to the said teats, and a partial vacuum is produced therein, such normal condition is upset to a certain extent, affecting the blood vessels and the circulation of the blood therein. When the ordinary air pressure on the exterior of the teats is thus reduced, it not only causes a flow of the milk from the bag, but there is also a movement of the blood downwardly into the teats. When a normal air pressure is restored, the blood will again move upwardly to its former position. On account of the intermittent movement of the machine, however, and the rapidity with which the suction pulsations follow each other, there is not sufficient time between such movements to permit a complete return of the blood to the blood vessels in the udder, and as the operation continues, the blood becomes more and more congested in the teats. This gives the animal some uneasiness, and discomfort, and frequently causes her to offer restraint to the action of the machine, to such an extent that the movement of the milk is entirely interrupted.

One of the purposes of my invention is to regulate the vibrations of the machine, so that after each suction there will be sufficient time for the blood to return upwardly into the udder, with no noticeable interruption in its circulation.

Another purpose of the device is to construct and arrange the parts thereof, so that a so-called vacuum period will be followed at once by a no-vacuum period, and the latter succeeded at once by a vacuum period again, so that there will be no lost time between such periods. In machines as now constructed and operated, each cycle of movement is divided into four approximately equal periods, two of which are active, and the other two, alternating therewith, are passive, so that one-half of the operating time is lost time. Starting with a suction movement, this occupies about one-fourth of the cycle, being followed by a period of equal length when the machine is passing from said period to a non-suction or compression period, which occupies another one-fourth of the time. The rest of the time is employed in passing back again to the suction period. It will thus be seen that the machine is active only one-half of the time, whereas in my invention it is actively operated for practically the entire cycle of movement.

Another feature of my device consists in the provision of means whereby the milking or vacuum period of each cycle can be adjustably increased or diminished, with a corresponding shortening or lengthening of the non-vacuum period.

These and other purposes and advantages of my invention will more fully appear in the following application, reference being had to the drawings accompanying the same, in which:

Figure 1 is a general view of my invention, in longitudinal section. Fig. 2 is a detail of the valve 12, in section. Fig. 3 is a detail of the valve-chamber 17. Fig. 4 is a similar view of the vent 23 and plug 24.

1 represents an exhaust-pump of usual construction, provided with a piston 2 and piston-rod 3, adapted for connection with some suitable power-imparting devices. At its inner end, pump 1 is provided with a vent 4, having a nipple 5, connected by a flexible pipe 6 with a tube 7, projected upwardly into a milk-chamber 8. Said chamber is also provided with a pipe 9, connected by means of a tube 11 with the usual teat-cup apparatus not shown herein. The milk-chamber illustrated herein is the same as is shown and described in my application for Letters Patent of the United States, filed May 12, 1916, Ser. No. 96,966, for improvements in milking machines. The particular type of such receptacles is immaterial in the present case, however, except that it must be capable of receiving and discharging milk by means of an intermittent vibratory movement, in response to the action of said pump.

The pipe 6 is provided at some point between the pump 1 and chamber 8 with a cylindrical member 12, in the center of which is a partition 13, which completely blocks the passage through such member. On opposite sides of said partition are series of perforations 14, closed by a sleeve 15, of rubber or similar yielding material. The sleeve 15 is secured tightly to the cylinder 12 near its ends by means of rings 16. In the outward or suction movement of the piston 2, the sleeve 15 is held tightly against the openings 14, and no air is permitted to enter the inner end of said cylinder. In the return movement of the piston, when the compression in the inner end of the pump becomes sufficiently strong, the air is forced outwardly through one set of openings 14, dilating the sleeve 15, and passing inwardly again through the other series of openings, from whence it finds its way through the tube 6 to the milk-chamber 8. The purpose of this structure and operation will be more fully hereinafter pointed out.

At an established point between the ends of the pump 1 is a valve-chamber 17, communicating with the interior of the pump, and also with a tube 18, connected with the pipe 6 at a point between the valve 12 and the milk-chamber. Said valve-chamber is provided with a valve-seat 19, normally closed by valve 20, held yieldably in place by a coiled spring 21.

When the piston 2 is drawn outwardly, a partial vacuum is formed between such piston and the inner end of the pump cylinder. This effect is not imparted to the milk-chamber, however, nor to the animal, until the piston passes the opening in the valve-chamber 17, whereupon the valve 20 is instantly opened and the suction of the pump imparted to the milk-chamber 8 and milking apparatus. Such suction is neutralized to some extent by the air in said milk-chamber and milking apparatus, so that there is no resultant shock upon the animal. After passing the opening to the valve 18, the degree of suction is held at approximately the same point, with possibly a slight increase therein, until the piston passes an opening 22 in the wall of the pump 1, permitting a sufficient inlet of air to prevent any further increase in the suction during the remainder of the stroke of the piston. Said suction is thereby held at a milking tension, from the time that the piston passes the inlet to the pipe 18, until it reaches the outer end of its stroke. The amount of air permitted to enter through the vent 22 is controlled by means of an interiorly threaded stem 23, engaged by a hollow, threaded plug 24, provided in its walls with slots 25. By turning said plug inwardly or outwardly, at will, said slots can be partially opened or closed.

As soon as the suction pressure begins to be reduced in the pump 1, the valve 20 is closed by the spring 21, and the vacuum, or partial vacuum in the milk-chamber and milking apparatus, is maintained at a milking point, until overcome by compression in the manner herein set forth.

In the return, or inward stroke of the piston, there is no compression of the air within the pump 1 until after the vent 22 has been passed. After passing such point, however, the air between the piston and the closed end of the pump is gradually compressed, until the force thereof causes the sleeve 15 to expand, permitting the passage of the charge of compressed air through the pipe 6 to the milk chamber, instantly relieving the suction pressure therein, remaining from preceding suction stroke of the pump. If it is desired to increase the suction period, this can be accomplished by moving the rings 16 on the sleeve 15 toward each other, thus increasing the resistance of such sleeve to the force of the air. Such sleeve member can contrarily be made to act more quickly by moving said rings outwardly thereon. The suction operation can be terminated more quickly by permitting a larger quantity of air to pass through the vent 22, so that the continued movement of the piston will not only be equalized thereby, but also the partial vacuum in the pump, permitting the valve 20 to be seated as soon as the piston passes the vent 22, or at any point in the movement of said piston between said vent and the outer end of the pump.

It will be obvious that a milking suction will be maintained in the milk-chamber for approximately one-half of the cycle of movement of the pump, which suction is released instantly by the next succeeding compression period, and that a compression condition is thereupon maintained in said milk-chamber until the suction of the pump opens the valve 20, causing said compression period to be instantly followed by another suction movement. There is, therefore, no lost time between said movements.

Each compression period, occupying approximately one-half of each movement of the machine, provides sufficient time for the blood in the udder and teats of the animal to circulate naturally, as hereinbefore set forth.

What I claim as my invention, and desire to secure, is:

1. In a device of the class described, a suction and pressure pump; a milk receiving and discharge chamber; a conduit connecting said pump and chamber; means in said conduit for preventing the passage of air from said chamber toward said pump, but permitting movement thereof in the opposite direction, under a predetermined pressure in said pump; a pipe connecting said conduit with said pump; and means in said pipe for preventing passage of air therethrough from said pump to said chamber, but permitting movement thereof in the opposite direction.

2. In a device of the class described, a suction and pressure pump; a milk receiving and discharging chamber; a conduit connecting said pump and chamber; means in said conduit for preventing the movement of air therethrough from said chamber to said pump, but permitting passage thereof in the opposite direction; a pipe connecting said conduit with said pump; and means in said pipe for preventing passage of the air therethrough from said pump to said chamber, but permitting movement of the air in the opposite direction, by means of suction created in said pump.

3. In a device of the class described, a suction and pressure pump; a milk receiving and discharging chamber; a conduit connecting said pump and chamber; means in said conduit for permitting the passage of air away from the pump, under pressure, but resisting the movement thereof in the opposite direction; a pipe connecting said conduit with said pump at an established point therein; means for permitting the passage of air from said chamber to said pump, under suction, but preventing movement thereof in the opposite direction; and means for admitting a predetermined supply of air to said pump, near the end of the suction stroke of the piston.

In testimony whereof I affix my signature.

WARREN A. SHIPPERT.